United States Patent
Green et al.

(10) Patent No.: US 8,848,401 B2
(45) Date of Patent: Sep. 30, 2014

(54) MODULAR MULTILEVEL POWER ELECTRONIC CONVERTER HAVING SELECTIVELY DEFINABLE CIRCULATION PATH

(75) Inventors: Timothy Charles Green, Haywards Heath (GB); Michael Marc Claude Merlin, Dourdan (FR); Nnamdi Okaeme, London (GB); David Reginald Trainer, Derby (GB)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 13/881,215

(22) PCT Filed: Oct. 27, 2010

(86) PCT No.: PCT/EP2010/066278
§ 371 (c)(1),
(2), (4) Date: Jul. 12, 2013

(87) PCT Pub. No.: WO2012/055435
PCT Pub. Date: May 3, 2012

(65) Prior Publication Data
US 2013/0279211 A1 Oct. 24, 2013

(51) Int. Cl.
*H02J 3/36* (2006.01)
*H02M 1/12* (2006.01)
*H02M 7/49* (2007.01)
*H02J 5/00* (2006.01)
*H02J 3/18* (2006.01)
H02M 7/483 (2007.01)

(52) U.S. Cl.
CPC .......... *H02J 5/00* (2013.01); H02M 2007/4835 (2013.01); *H02M 7/49* (2013.01); *H02J 3/1814* (2013.01)
USPC ......................................................... 363/35

(58) Field of Classification Search
CPC ........... H02M 7/06; H02M 1/12; H02M 7/21; H02M 7/217; H02M 7/2176; H02M 2001/12; H02M 2007/217
USPC ................... 363/35–39, 44, 65–68, 125–132; 323/205–208, 266
See application file for complete search history.

(56) References Cited

U.S. PATENT DOCUMENTS 5,075,838 A * 12/1991 Schnetzka et al. ............... 363/37
5,345,375 A * 9/1994 Mohan ............................. 363/40
(Continued)

FOREIGN PATENT DOCUMENTS

| DE | 10 2008 014898 A1 | 9/2009 |
| WO | 2007 033852 A2 | 3/2007 |
| WO | 2008 067784 A1 | 6/2008 |

OTHER PUBLICATIONS

A. Antonopoulis, L. Angquist, H.P. Nee: "On Dynamics and Voltage Control of the Modular Multilevel Converter", Sep. 8, 2009, Laboratory of Electrical Machines and Power Electronics Royal Institute of Technology (KTH)Stockholm, Sweden.

(Continued)

*Primary Examiner* — Timothy J Dole
*Assistant Examiner* — Yusef Ahmed
(74) *Attorney, Agent, or Firm* — Pearne & Gordon LLP

(57) ABSTRACT

A power electronic converter for use in high voltage direct current power transmission and reactive power compensation includes at least one converter limb, which includes first and second DC terminals and an AC terminal. Each converter limb defines first and second limb portions connected in series between the AC terminal and a respective one of the first and second DC terminals. Each limb portion includes a chain-link converter connected in series with at least one primary switching element. Each chain-link converter includes a plurality of modules connected in series, and each module includes at least one secondary switching element connected to at least one energy storage device. Each primary switching element in each limb portion of a respective converter limb selectively defines a circulation path which carries a DC circulation current to regulate the energy level of at least one energy storage device in a respective chain-link converter.

22 Claims, 10 Drawing Sheets

(56) References Cited

U.S. PATENT DOCUMENTS

| | | | |
|---|---|---|---|
| 5,499,178 A * | 3/1996 | Mohan | 363/39 |
| 5,892,677 A * | 4/1999 | Chang | 363/152 |
| 5,936,855 A * | 8/1999 | Salmon | 363/46 |
| 7,170,767 B2 * | 1/2007 | Bixel | 363/65 |
| 7,622,825 B2 * | 11/2009 | Brune et al. | 307/82 |
| 2005/0127853 A1 * | 6/2005 | Su | 318/108 |
| 2008/0007978 A1 * | 1/2008 | Han | 363/35 |
| 2008/0031019 A1 * | 2/2008 | Alexander | 363/37 |
| 2008/0179951 A1 * | 7/2008 | Brune et al. | 307/31 |
| 2008/0310205 A1 | 12/2008 | Hiller | |
| 2009/0206781 A1 * | 8/2009 | Itoh et al. | 318/400.3 |
| 2010/0007209 A1 * | 1/2010 | Eppler et al. | 307/36 |
| 2010/0067266 A1 | 3/2010 | Dommaschk et al. | |
| 2010/0118578 A1 * | 5/2010 | Dommaschk et al. | 363/127 |
| 2011/0018481 A1 | 1/2011 | Hiller | |
| 2012/0026767 A1 * | 2/2012 | Inoue et al. | 363/89 |
| 2012/0069610 A1 | 3/2012 | Trainer et al. | |
| 2012/0113699 A1 | 5/2012 | Crookes et al. | |
| 2012/0120697 A1 * | 5/2012 | Cuk | 363/126 |
| 2012/0127766 A1 * | 5/2012 | Crookes et al. | 363/126 |
| 2012/0170338 A1 * | 7/2012 | Trainer et al. | 363/127 |
| 2012/0182771 A1 * | 7/2012 | Trainer et al. | 363/51 |
| 2012/0188803 A1 | 7/2012 | Trainer et al. | |
| 2013/0094264 A1 | 4/2013 | Crookes et al. | |
| 2013/0119970 A1 | 5/2013 | Trainer et al. | |
| 2013/0128636 A1 * | 5/2013 | Trainer et al. | 363/65 |
| 2013/0194838 A1 * | 8/2013 | Jang et al. | 363/37 |
| 2013/0208514 A1 * | 8/2013 | Trainer et al. | 363/35 |
| 2013/0208521 A1 * | 8/2013 | Trainer et al. | 363/126 |

OTHER PUBLICATIONS

B. Chuco, E.H.Watanabe: "A comparative study of dynamic performance of HVDC system based on conventional VSC and MMC-VSC", Bulk Power Systems and Dynamic Control, Aug. 1, 2010, 2010 IREP Symposium, Buzios, Brazil.

International Search Report for PCT/EP2010/066278 dated Aug. 30, 2011.

* cited by examiner

MODULAR MULTILEVEL POWER ELECTRONIC CONVERTER HAVING SELECTIVELY DEFINABLE CIRCULATION PATH

The invention relates to a voltage source converter for use in high voltage direct current (HVDC) power transmission and reactive power compensation.

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC to DC power is also utilized in power transmission networks where it is necessary to interconnect AC networks operating at different frequencies.

In any such power transmission network, converters are required at each interface between AC and DC power to effect the required conversion, and one such form of converter is a voltage source converter (VSC).

One form of known voltage source converter is shown in FIG. 1 and includes six sets of series connected insulated gate bipolar transistors (IGBTs) 10 and anti-parallel diodes 12. The IGBTs 10 are connected and switched together in series to enable high power ratings of 10's to 100's of MW to be realized.

This approach however is likely to require a complex and active IGBT drive, and may also require large passive snubber components to ensure that the high voltage across the series strings of IGBTs 10 shares properly during converter switching. In addition the IGBTs 10 need to switch on and off several times at high voltage over each cycle of the AC supply frequency to control the harmonic currents being fed to the AC network 14. These factors lead to high losses, high levels of electromagnetic interference and a complex design.

Another known voltage source converter is shown in FIG. 2 and includes a multilevel converter arrangement. The multilevel converter arrangement includes converter bridges 16 of cells 18 connected in series, each converter cell 18 including a pair of series connected IGBTs 20 connected in parallel with a capacitor 22. Each converter cell 18 may be switched at a different time and as such the arrangement eliminates the problems associated with the direct switching of series connected IGBTs because the individual converter cells 18 do not switch simultaneously and converter voltage steps are comparatively small.

The capacitor 22 of each converter cell 18 must however have a high capacitive value to constrain the voltage variation at the capacitor terminals in the multilevel converter arrangement. Six DC side reactors 24 are also required to enable the parallel connection and operation of the converter limbs 26, and are primarily used to limit transient current flow between converter limbs 26.

These factors lead to expensive, large and heavy equipment with significant amounts of stored energy, making pre-assembly, testing and transportation of the equipment difficult.

According to an aspect of the invention, there is provided a power electronic converter, for use in high voltage direct current power transmission and reactive power compensation, comprising at least one converter limb including first and second DC terminals for connection in use to a DC network and an AC terminal for connection in use to an AC network, the or each converter limb defining first and second limb portions connected in series between the AC terminal and a respective one of the first and second DC terminals, each limb portion including a chain-link converter connected in series with at least one primary switching element, each chain-link converter including a plurality of modules connected in series, each module including at least one secondary switching element connected to at least one energy storage device, the or each primary switching element in each limb portion of a respective converter limb selectively defining a circulation path carrying a DC circulation current to regulate the energy level of at least one energy storage device in a respective chain-link converter.

The provision of one or more primary switching elements that are able to selectively define a circulation path which carries a DC circulation current to regulate the energy level of at least one energy storage device removes the need for separate energy balancing equipment. As a result the power electronic converter of the invention is cheaper, smaller and lighter than conventional power converters, as well as being simpler to operate and control.

Such a power electronic converter is also compatible with a wide range of real and reactive power operating conditions.

Preferably the or each primary switching element is controllable to simultaneously switch both limb portions into circuit to define the circulation path. The creation of such a circulation path provides the option of regulating the energy level of all the energy storage devices in each chain-converter.

Optionally the or each primary switching element of each limb portion selectively defines the circulation path for a predetermined overlap period to control the duration for which the DC circulation current flows.

The ability to control how long the DC circulation current allows for variations in the extent to which energy is removed or restored to a given energy storage device, and so allows a desired amount of energy to be removed from or restored to a given energy storage device without the need for separate energy balancing equipment.

In a preferred embodiment of the invention the circulation path includes at least one DC current modifier to modify the magnitude of the DC circulation current.

The inclusion of one or more DC current modifiers provides a further option for controlling the extent to which energy is removed from or restored to a given energy storage device without the need for separate energy balancing equipment.

The DC current modifier may modify the magnitude of the DC circulation current to minimise any deviation in voltage of the or each energy storage device from a predetermined voltage level.

The regulation of voltage levels of one or more energy storage devices provides the option of balancing the voltage levels of respective modules. This is advantageous because it means that the voltage of any particular module can be kept approximately equal to an average module voltage to help ensure module components are operated within their design voltage limits and the combined modules are capable of generating the appropriate range of converter terminal voltage to satisfy steady-state operation and fault responses.

In another preferred embodiment of the invention the DC current modifier is or includes at least one of the chain-link converters and at least one primary inductor connected in series with the or each chain-link converter, the or each chain-link converter being operable to vary its voltage to alter the voltage across the or each primary inductor and thereby modify the magnitude of the DC circulation current.

Such an arrangement readily allows a desired amount of energy to be removed from or restored to a given energy storage device without the need for separate energy balancing equipment.

The power electronic converter may further include at least one DC link capacitor connected in series between the first and second DC terminals of the or each converter limb and connected in parallel with the or each converter limb.

The or each DC link capacitor not only acts to regulate the DC voltage presented to the DC network by minimising the presence of DC ripple, but is also included in the or each circulation path.

Preferably the power electronic converter further includes at least one tertiary inductor connected in series with the or each DC link capacitor between the first and second DC terminals of the or each converter limb.

The inclusion of at least one tertiary inductor results in improved control over the flow of current within the power electronic converter and thereby increases the reliability of the power electronic converter.

Optionally the DC current modifier is or includes at least one variable primary inductor, the or each variable primary inductor being controllable to vary its inductance to modify the DC circulation current.

On or more such variable primary inductors can be used to provide active control over the energy regulation procedure.

In a further embodiment of the invention the chain-link converters are operable to generate a voltage waveform at the AC terminal.

The or each secondary switching element of each module of each chain-link converter may be controllable to configure the respective chain-link converter to provide a stepped variable voltage source.

Such features allow the power electronic converter to carry out rectification and inversion processes so as to facilitate power conversion between the AC and DC networks.

Preferably the power electronic converter further includes at least one secondary inductor connected in series with the AC terminal of the or each converter limb for connection in use between the respective AC terminal and the AC network.

The inclusion of one or more secondary inductors helps to regulate the AC current on the AC side of the power electronic converter.

Optionally the or each secondary inductor is controllable to vary its inductance so as to generate an AC current waveform flowing between the respective AC terminal and the AC network while the respective circulation path is defined.

Such a secondary inductor controls the characteristics of the AC current during the energy regulation procedure, and so the DC circulation current can be modified to follow various waveform shapes, such as square, triangular and saw tooth waveforms, without significantly affecting the connected AC network.

Preferably the AC current waveform is a near approximation of a sinusoidal waveform.

The generation of an AC current in the form of a near-perfect sine-wave, with minimal harmonic distortion, means that there is no requirement for harmonic filters on the AC side of the power electronic converter to control power quality.

In a still further preferred embodiment of the invention at least one module includes a plurality of series-connected secondary switching elements connected in parallel with a respective energy storage device.

Preferably the plurality of series-connected secondary switching elements are connected in parallel with the respective energy storage device in a half-bridge arrangement to define a 2-quadrant unipolar module that can provide zero or positive voltage and can conduct current in two directions.

Optionally the plurality of series-connected secondary switching elements are connected in parallel with the respective energy storage device in a full-bridge arrangement to define a 4-quadrant bipolar module that can provide zero, positive or negative voltage and can conduct current in two directions.

Preferably at least one primary or secondary switching element includes at least one semiconductor device.

The or at least one semiconductor device may be an insulated gate bipolar transistor, a gate turn-off thyristor, a field effect transistor, an insulated gate commutated thyristor or an integrated gate commutated thyristor.

The or at least one primary or secondary switching element may further include an anti-parallel diode connected in parallel with the or each corresponding semiconductor device.

The use of semiconductor devices is advantageous because such devices are small in size and weight and have relatively low power dissipation, which minimises the need for cooling equipment. Their use therefore leads to significant reductions in power converter cost, size and weight.

In addition, the fast switching capabilities of such semiconductor devices allow the power electronic converter to synthesize complex waveforms for injection into the AC side and/or DC side of the power electronic converter. The injection of such complex waveforms can be used, for example, to minimise the levels of harmonic distortion typically associated with line-commutated thyristor-based power electronic converters.

In another preferred embodiment of the invention at least one energy storage device is a capacitor, a fuel cell, a photovoltaic cell, a battery or an auxiliary AC generator with an associated rectifier.

Each energy storage device may be any device that is capable of storing and releasing its electrical energy to provide a voltage. This flexibility is useful in designing power electronic converters in different locations where the availability of equipment may vary due to locality or transport difficulties. For example, on offshore wind farms, the energy storage device may be an auxiliary AC generator connected to a wind turbine.

In other embodiments of the invention, the chain-link converter of each limb portion may be controllable to vary its voltage so as to enable switching of the or each primary switching element of the respective limb portion at near zero current and/or near zero voltage.

Such switching of the or each primary switching element at low or zero current and/or voltage minimises the switching losses in the respective primary switching element and thereby improves the overall efficiency of the power electronic converter.

Optionally the power electronic converter includes multiple converter limbs, each converter limb including an AC terminal for connection in use to a respective phase of an AC network.

In such a power electronic converter the series connection of the primary switching elements and chain-link converters of each converter limb operates independently of that of the other converter limbs and therefore only directly affects the phase connected to the respective AC terminal. As a result the operation of one converter limb has minimal influence on the phases connected to the AC terminals of the other converter limbs.

Preferred embodiments of the invention will now be described, by way of non-limiting examples, with reference to the accompanying drawings in which.

Figure 1:
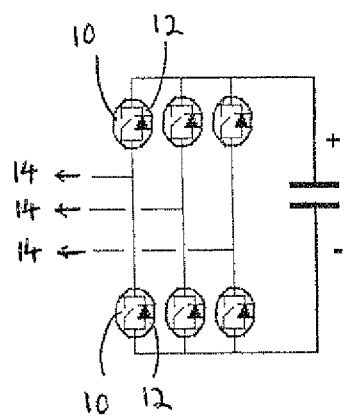
FIGS. 1 and 2 show, in schematic form, prior art voltage source converters.
Figure 2:
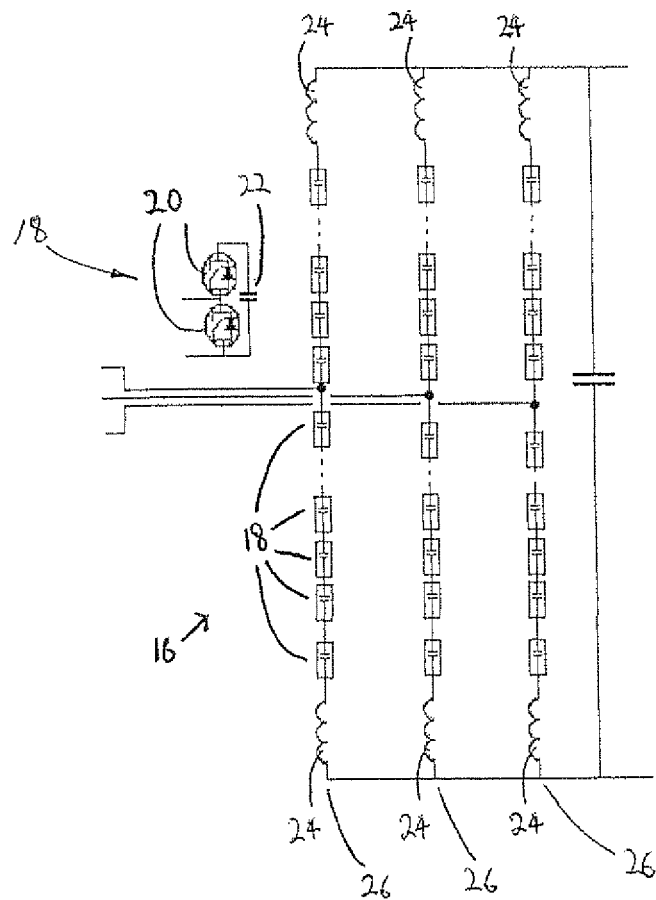
Figure 3:
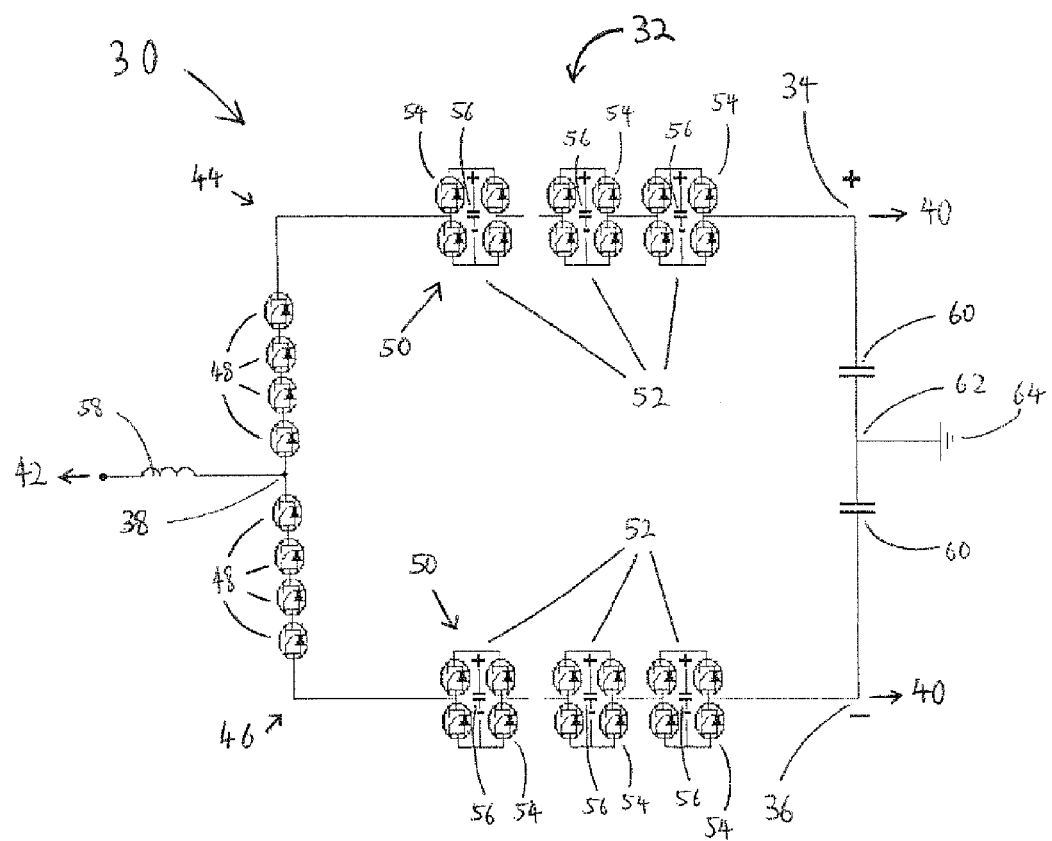
FIG. 3 shows a power electronic converter according to a first embodiment of the invention.
Figure 5A:
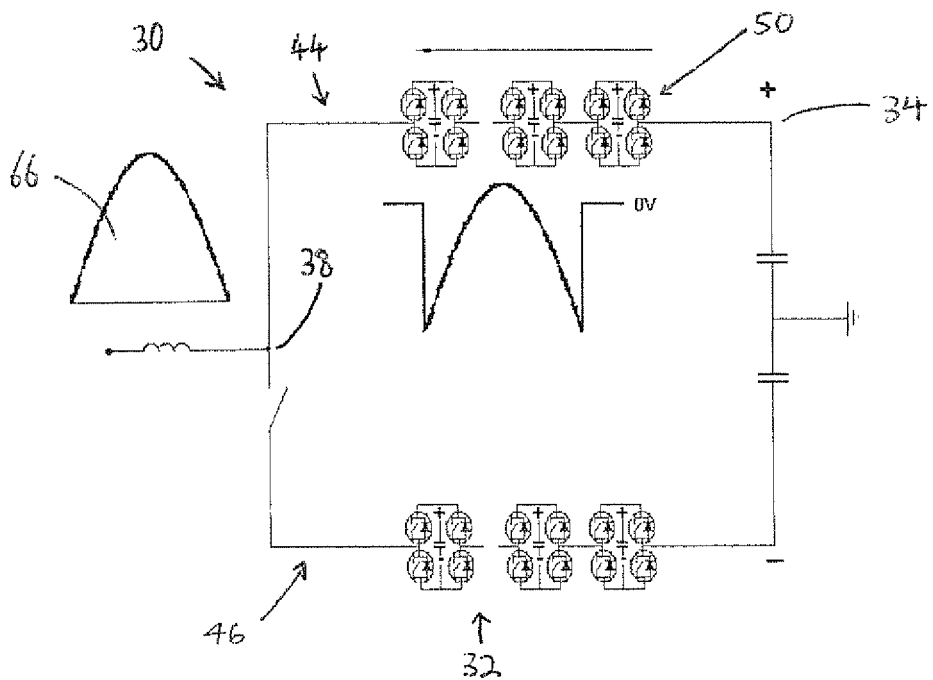
Figure 5B:
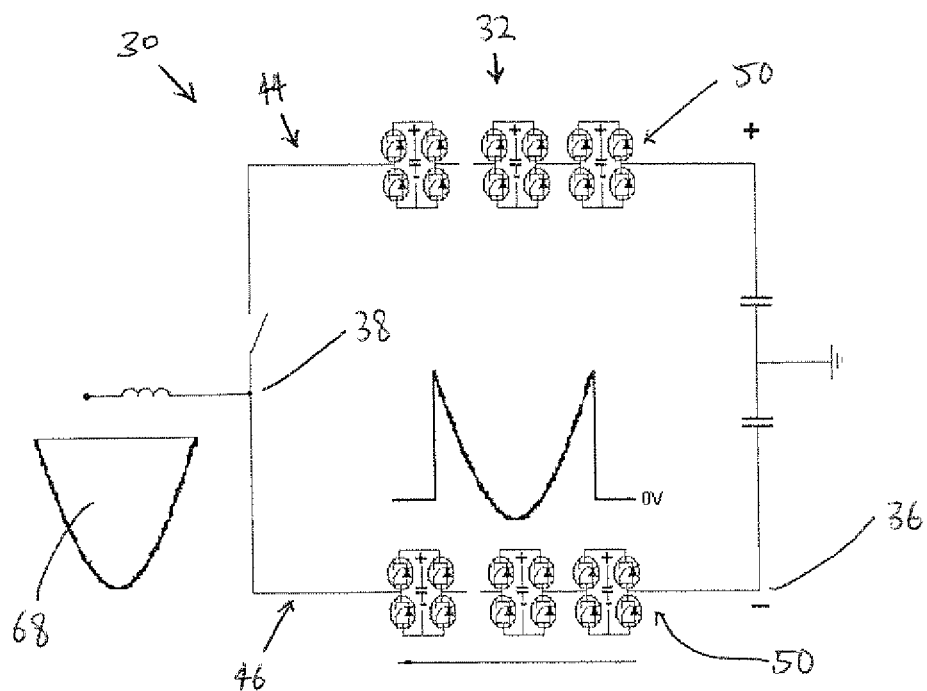
Figure 6:
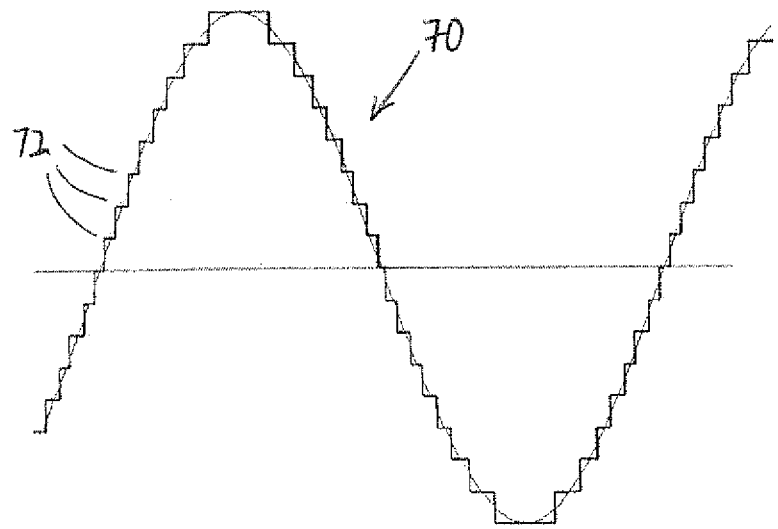
Figure 7A:
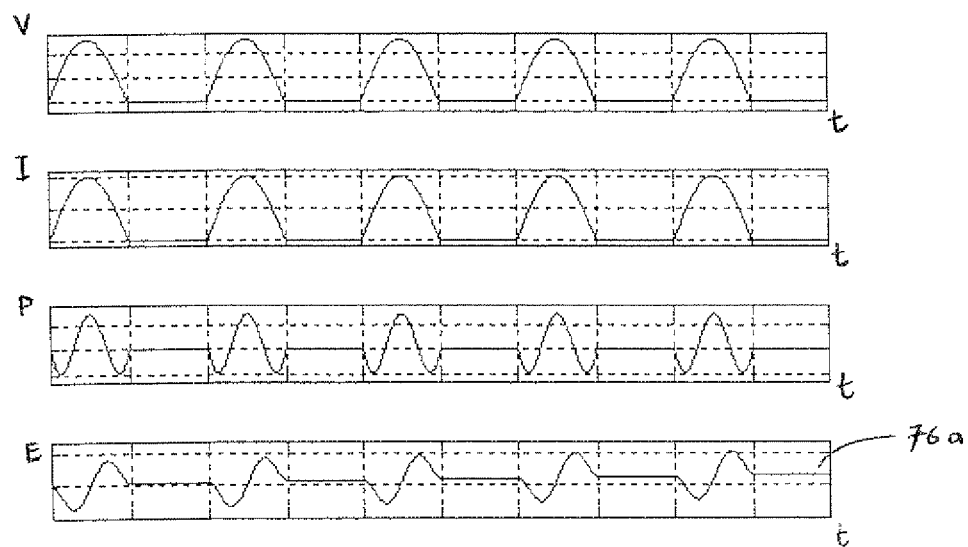
Figure 7B:
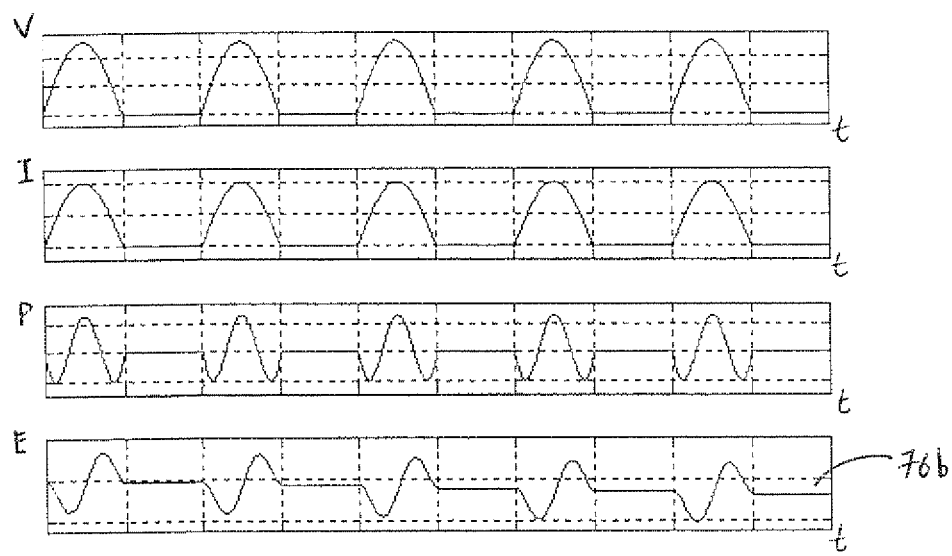
Figure 7C:
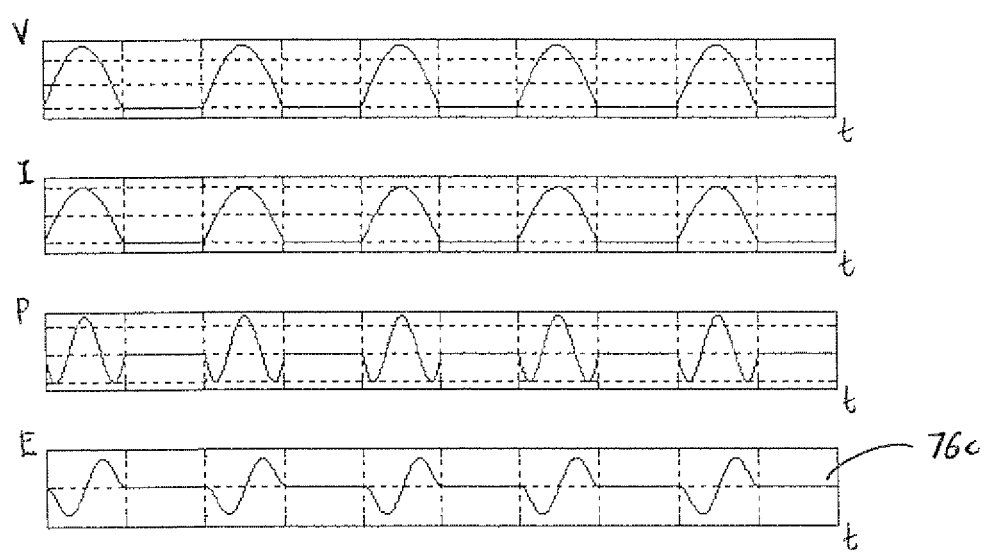
Figure 8:
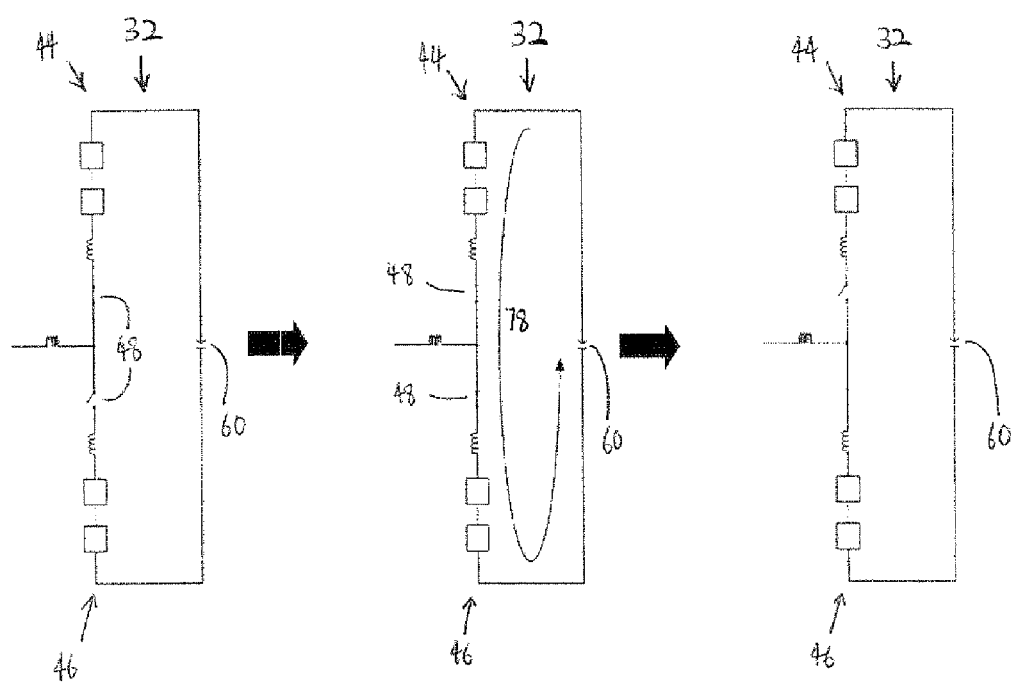
Figure 9:
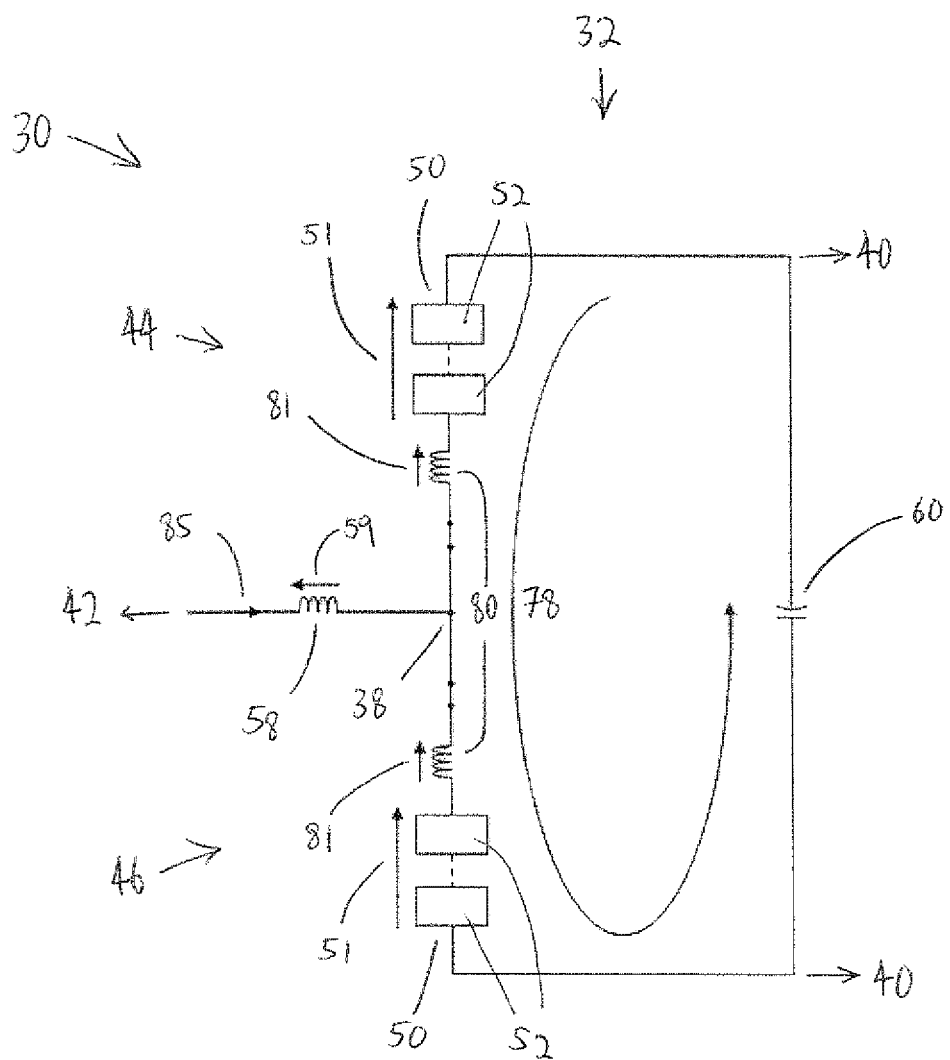
Figure 10A:
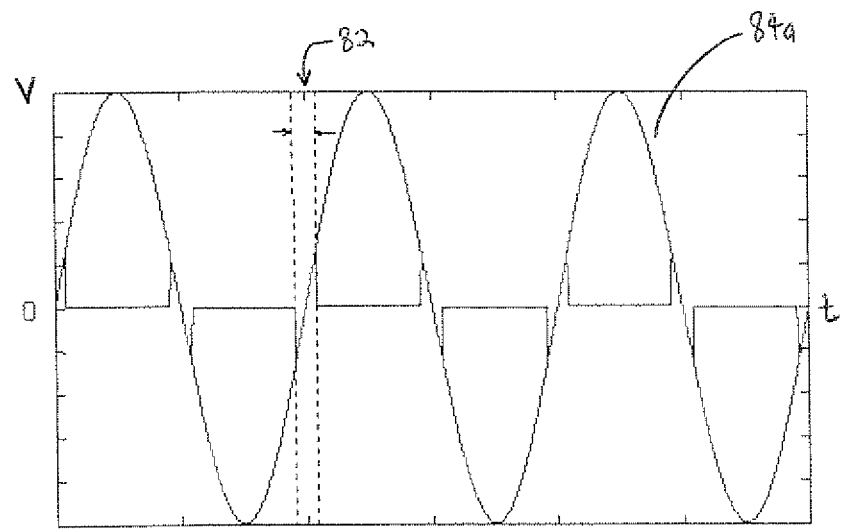
Figure 10B:
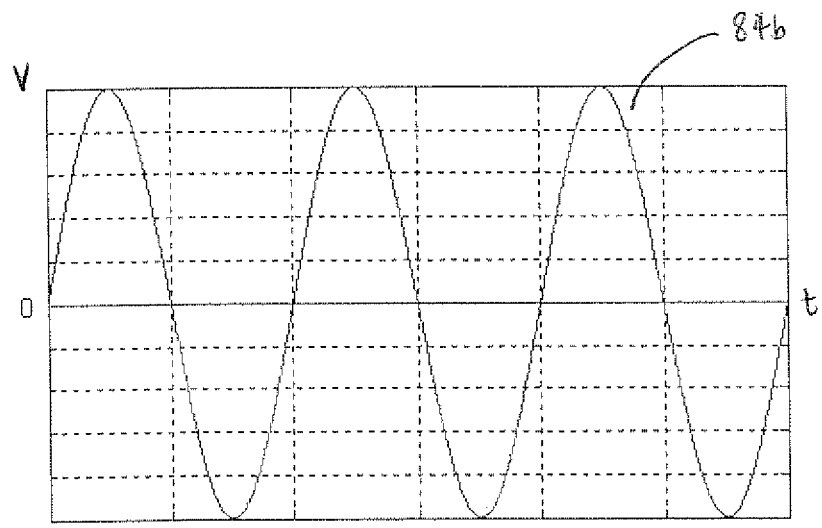
Figure 11:
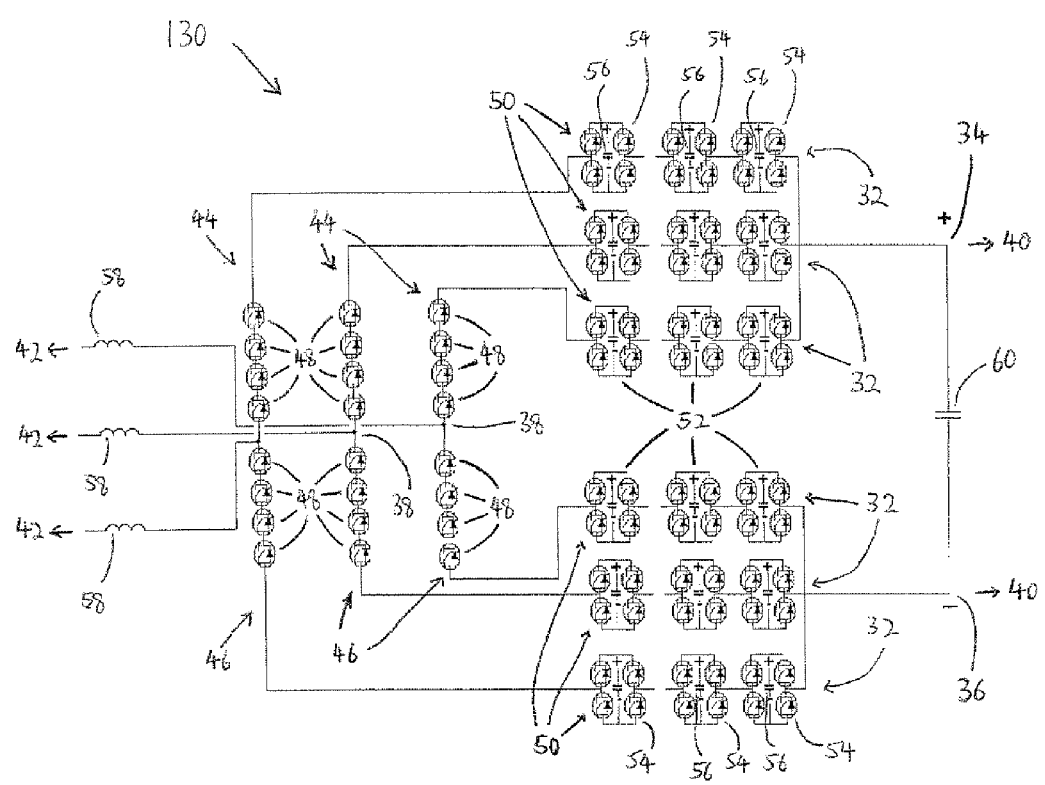

FIGS. 5a and 5b respectively show the generation of positive and negative half-cycles of an AC voltage waveform;

FIG. 6 shows a step-wise approximation of an AC voltage waveform;

FIGS. 7a and 7b respectively show the energy change over time in a chain-link converter importing real power and exporting real power;

FIG. 7c shows the power characteristics of a chain-link converter experiencing a net zero energy change over time;

FIG. 8 shows the creation of a circulation path in the power electronic converter shown in FIG. 3;

FIG. 9 shows an enlarged view of the circulation path shown in FIG. 8;

FIG. 10a shows the variation in AC voltage of the power electronic converter shown in FIG. 3 while the circulation path is defined;

FIG. 10b shows the variation in AC voltage of the power electronic converter shown in FIG. 3 when no circulation path is defined; and FIG. 11 shows a power electronic converter according to a second embodiment of the invention.

A power electronic converter 30 according to a first embodiment of the invention is shown in FIG. 3.

The power electronic converter 30 comprises a converter limb 32 including first and second DC terminals 34,36 and an AC terminal 38.

In use, the first and second DC terminals 34,36 are respectively connected to positive and negative terminals of a DC network 40, the positive and negative terminals respectively carrying voltages of +Vdc/2 and −Vdc/2, while the AC terminal 38 is connected in use to an AC network 42.

The converter limb 32 defines first and second limb portions 44,46. In the converter limb 32, the first limb portion 44 is connected in series between the AC terminal 38 and the first DC terminal 34 while the second limb portion 46 is connected in series between the AC terminal 38 and the second DC terminal 36.

In the embodiment shown each limb portion 44,46 includes four series-connected primary switching elements 48. In other embodiments, each limb portion may include more or less than four primary switching elements depending on the required voltage rating of each limb portion 44,46.

Each limb portion 44,46 further includes a chain-link converter 50 connected in series with the series-connected primary switching elements 48. In the embodiment shown each chain-link converter 50 includes three modules 52 connected in series. The number of modules 52 in each chain-link converter 50 depends on the required voltage rating of the respective limb portion 44,46 and so can be more or less than three depending on the voltage rating requirements.

Each module 52 of each chain-link converter 50 includes two pairs of secondary switching elements 54 connected in parallel with a capacitor 56 to define a 4-quadrant bipolar module that can provide negative, zero or positive voltage and can conduct current in two directions.

The series connection between the plurality of series-connected primary switching elements 48 and the chain-link converter 50 of each of the first and second limb portions 44,46 allows, in other embodiments of the invention, the primary switching elements 48 and the chain-link converter 50 to be connected in a reverse order between the AC terminal 38 and the respective DC terminal 34,36.

Each limb portion 44,46 further includes a primary inductor 80 that is connected in series with the chain-link converter 50 and the plurality of series-connected primary switching elements 48. The primary inductor of each limb portion 44,46 helps to limit transient current flow between the capacitors 56 in the modules 52 of each chain-link converter 50 and any other parallel connected capacitor, and thereby minimises energy losses.

The power electronic converter 30 further includes a secondary inductor 58 connected in series with the AC terminal 38 of the converter limb 32 for connection in use between the AC terminal 38 and the AC network 42. The secondary inductor 58 regulates the AC current flowing between the AC terminal 38 and the AC network 42.

The power electronic converter 30 also includes a pair of DC link capacitors 60 connected in series between the first and second DC terminals 34,36 and connected in parallel with the converter limb 32. In the embodiment shown a junction 62 between the pair of DC link capacitors 60 defines a connection to ground 64. In other embodiments of the invention (not shown) the junction 62 need not be connected to ground.

The secondary switching elements 54 of the modules 52 of each chain-link converter 50 are operable to configure each chain-link converter 50 to provide a stepped variable voltage source. The secondary switching elements 54 are also switched at near to the fundamental frequency of the AC network 42.

The capacitor 56 of each module 52 may be bypassed or inserted into the respective chain-link converter 50 by changing the state of the secondary switching elements 54.

The capacitor 56 of each module 52 is bypassed when the pairs of secondary switching elements 54 are configured to form a short circuit in the module 52. This causes the current in the power electronic converter 30 to pass through the short circuit and bypass the capacitor 56, and so the module 52 is able to provide a zero voltage.

The capacitor 56 of each module 52 is inserted into the respective chain-link converter 50 when the pair of secondary switching elements 54 is configured to allow the converter current to flow into and out of the capacitor 56. The capacitor 56 is then able to charge or to discharge its stored energy so as to provide a voltage. The bidirectional nature of the 4-quadrant bipolar module 52 means that the capacitor 56 may be inserted into the module 52 in either forward or reverse directions so as to provide a positive or negative voltage.

It is therefore possible to build up a combined voltage across each chain-link converter 50 which is higher than the voltage available from each individual module 52 via the insertion of the capacitors 56 of multiple modules 52, each providing its own voltage, into the chain-link converter 50.

The ability of a 4-quadrant bipolar module 52 to provide positive or negative voltages means that the voltage across each chain-link converter 50 may be built up from a combination of modules 52 providing positive or negative voltages. The energy levels in individual capacitors 56 may be maintained therefore at optimal levels by controlling the modules 52 to alternate between providing positive or negative voltage.

In other embodiments of the invention (not shown), it is envisaged that each module of each chain-link converter may include a set of series-connected secondary switching elements connected in parallel with the respective capacitor in a half-bridge arrangement to define a 2-quadrant unipolar module that can provide zero or positive voltage and can conduct current in two directions.

Figure 4:
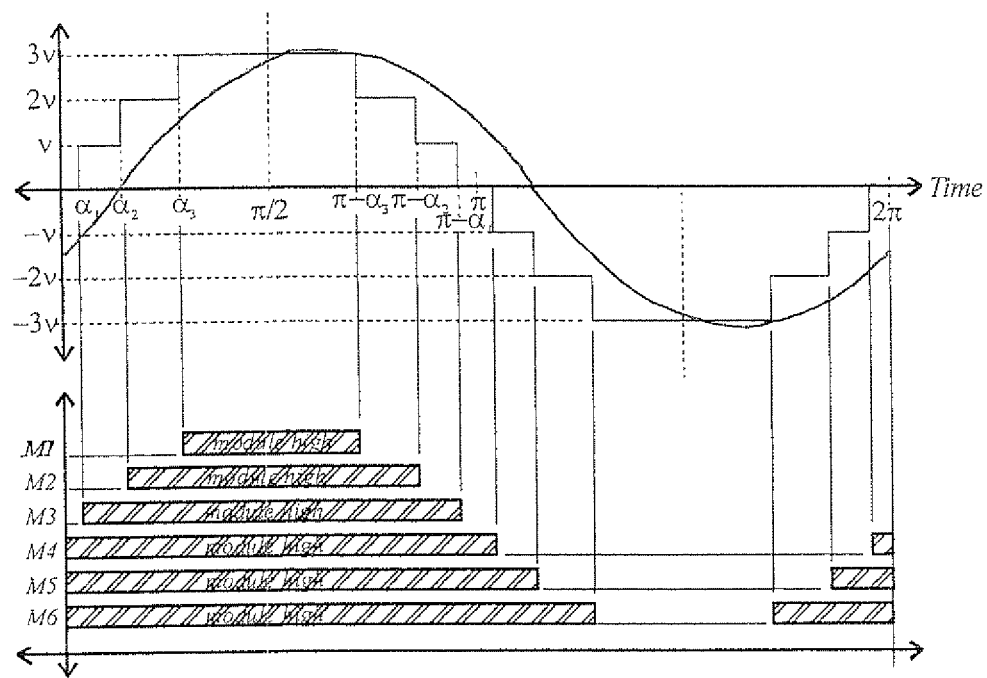
FIG. 4 shows a synthesis of a 50 Hz sinusoidal waveform using a chain-link converter.

It is possible to vary the timing of switching operations for each module 52 such that the insertion and/or bypass of the capacitors 56 of individual modules 52 in the chain-link converter 50 results in the generation of a voltage waveform. An example of a voltage waveform generated using the chain-link converters 50 in the first embodiment is shown in FIG. 4. Insertion of the capacitors 56 of the individual modules 52 is staggered to generate a 50 Hz sinusoidal waveform. Other waveform shapes may be generated by adjusting the timing of switching operations for each module 52 in the chain-link converter 50.

In the embodiment shown each of the primary and secondary switching elements 48,54 is an insulated gate bipolar transistor (IGBT). In other embodiments of the invention (not shown) one or more of the primary and secondary switching elements 48, 54 may include a different semiconductor device, such as a field effect transistor, a gate-turn-off thyristor, an insulated gate commutated thyristor, an integrated gate commutated transistor or other forced commutated or self commutated semiconductor switches. As shown in FIG. 3, each primary and secondary switching element 48,54 is connected in parallel with an anti-parallel diode.

The fast switching capabilities of the aforementioned semiconductor devices allows the power electronic converter 30 to synthesize complex waveforms for injection into the AC side and/or DC side of the power electronic converter 30. The injection of such complex waveforms can be used, for example, to minimise the levels of harmonic distortion typically associated with line-commutated thyristor-based voltage source converters.

It is also envisaged that in other embodiments of the invention (not shown), the capacitor 56 of each module 52 may be replaced by a different energy storage device such as a fuel cell, a battery, a photovoltaic cell or an auxiliary AC generator with an associated rectifier.

In use, the primary switching elements 48 of the first and second limb portions 44,46 are operable to switch each of the chain-link converters 50 in and out of circuit between the respective DC terminal 34,36 and the AC terminal 38. The chain-link converters 50 are also operable to generate a voltage waveform at the respective AC terminal 38 to facilitate power conversion between the AC and DC networks 42,40.

FIGS. 5a and 5b show the operation of the power electronic converter 30 to generate positive and negative half-cycles of an AC voltage waveform at the AC terminal 38 of the converter limb 32.

To generate the positive half-cycle 66 of the AC voltage waveform, the first limb portion 44 is switched into circuit while the second limb portion 46 is switched out of circuit and the chain-link converter 50 of the first limb portion 44 is controlled to vary its voltage. The chain-link converter 50 voltage is varied to offset the voltage at the first DC terminal 34, and thereby synthesize a positive half-sine wave 66 at the AC terminal 38, as shown in FIG. 5a.

To generate the negative half-cycle 68 of the AC voltage waveform, the first limb portion 44 is switched out of circuit while the second limb portion 46 is switched into circuit and the chain-link converter 50 of the second limb portion 46 is controlled to vary its voltage. The voltage of the chain-link converter 50 is again varied to offset the voltage at the second DC terminal 36, and thereby synthesize a negative half-sine wave 68 at the AC terminal 38.

The chain-link converters 50 are preferably operable to generate a sinusoidal voltage waveform 70 using a step-wise approximation, as shown in FIG. 6. The chain-link converters are suitable for use in step-wise waveform generation due to their ability to provide voltage steps 72 to increase or decrease the output voltage at the respective AC terminal. The step-wise approximation of the voltage waveform 70 may be improved by using a higher number of modules with lower voltage levels to increase the number of voltage steps 72.

As outlined above, during the operation of the power electronic converter 30 to convert AC power to DC power and vice versa, the power levels on the AC and DC sides of the power electronic converter 30 may vary depending on the real and reactive power requirements of the connected AC and DC networks 42,40.

When the power levels on the AC and DC sides of the power electronic converter 30 are unequal, each chain-link converter 50 imports or exports real power during the power conversion process. This can result in an increase or decrease in energy level 76a,76b of each chain-link converter 50 over time, as shown in FIGS. 7a and 7b. These variations in energy level may lead to each module 52 being either completely discharged or damaged from excessive voltage levels. The variations may also lead to failure of the chain-link converters 50 to synthesize specific voltage waveforms at the respective AC terminal 38.

It is desirable, therefore, to maintain a net zero energy change 76c in each chain-link converter over time, as shown in FIG. 7c. To achieve a net zero energy change the power electronic converter 30 is configured to operate as follows.

A short while before the transition from the positive half-cycle to the negative half-cycle of the AC voltage waveform, the primary switching elements 48 of each limb portion 44,46 are turned on to simultaneously switch both limb portions 44,46 into circuit, as shown in the middle schematic of FIG. 8, and in FIG. 9. Both sets of primary switching elements 48 are switched on for a predetermined period, i.e. an overlap period 82. Simultaneous switching on of the primary switching elements 48 results in the definition of a circulation path 78 that includes each limb portion 44, 46 of the converter limb 32 and the DC link capacitors 60, as shown in FIGS. 8 and 9.

For the purposes of simplicity, the pair of DC link capacitors 60 is illustrated as a single DC link capacitor in each of FIGS. 8 and 9.

During the overlap period 82 the circulation path 78 carries a DC circulation current that can flow in either direction within the circulation path 78. The DC circulation current can be used to restore depleted charge or remove excessive charge from any capacitor 56 in a respective module 52 of each chain-link converter 50 that has an energy level which deviates from a desired value. As a result the DC circulation current is able to maintain a net zero energy change in each chain-link converter 50.

In particular, during the overlap period 82, each chain-link converter 50 is controlled to insert one or more of its modules 52 having a voltage that deviates from the desired average value (or falls outside a desired operating range). Each module 52 may be inserted in a forward or reverse direction, depending on the voltage level of each module 52, with the insertion of such modules 52 allowing the DC circulation current to flow through the inserted modules 52 so as to either restore the depleted energy in the respective capacitor 56 or remove excessive energy from the respective capacitor 56, as may be necessary.

Any capacitors 56 in a given chain-link converter 50 that are already at the desired energy level may be bypassed.

In a preferred embodiment of the invention capacitor energy regulation, i.e. capacitor charge removal or restoration, is controlled by varying the duration of the overlap period 82 and/or the magnitude of the DC circulation current.

For example, the longer the duration of the overlap period 82 the smaller the magnitude of the DC circulation current required for a given degree of energy removal or restoration.

In a preferred embodiment of the invention the overlap period 82 spans the transition from generating a positive half-cycle 66 to generating a negative half-cycle 68, and most preferably extends equally into each generating portion. Such operation allows the capacitor energy regulation procedure to be readily integrated into the power conversion process so as to allow continuous operation of the power electronic converter 30

Preferably the magnitude of the DC circulation current is varied by operating each chain-link converter 50 to insert or bypass its modules 52 so as to vary the voltage 51 across the respective chain-link converter 50 and in turn vary the voltage across the associated primary inductor 80. In this regard each chain-link converter 50 and the or each associated primary inductor 80 together act as a DC current modifier. The ability of each chain-link converter 50 to generate complex voltage waveforms as outlined above allows the DC circulation current to be modified accurately to fit the requirements of the capacitor energy balancing procedure.

In other embodiments of the invention (not shown), the power electronic converter may further include at least one tertiary inductor connected in series with the pair of DC link capacitors between the first and second DC terminals of the converter limb. The or each such tertiary inductor also forms part of the circulation path 78 created during the overlap period 82 and therefore varying the voltage across the or each chain-link converter 50, as described above, also varies the voltage across the or each tertiary inductor, and so provides additional control of the magnitude of the DC circulation current.

Following the capacitor energy regulation procedure, the primary switching elements 48 of the first limb portion 44 are turned off so as to switch the first limb portion 44 out of circuit and thereby allow the power electronic converter 30 to generate the negative half-cycle of the AC voltage waveform at the AC terminal 38, as shown in the rightmost schematic in FIG. 8.

Similarly, a short while before the transition from the negative half-cycle to the positive half-cycle of the AC voltage waveform, the primary switching elements 48 of both limb portions 44,46 are again turned on simultaneously to define the circulation path 78 and thereby allow the capacitor energy regulation procedure to take place.

FIG. 10*a* shows the change in AC voltage over time when the capacitor energy regulation procedure takes place during each half-cycle, i.e. when the circulation path 78 is defined for respective overlap periods 82.

As an alternative to the use of at least one chain-link converter 50 to alter the magnitude of the DC circulation current, it is envisaged that other embodiments of the invention (not shown) may include a different DC current modifier in the form of a variable primary inductor. Such a variable primary inductor would be operable to vary its inductance so as to directly vary the voltage 81 thereacross, and hence the magnitude of the DC circulation current flowing therethrough.

During the overlap period 82, either or both of the chain-link converters 50 may additionally be operated to modify the AC current 85 flowing between the AC terminal 38 and the AC network 42 so that the AC current 85 follows a near approximation of a sinusoidal waveform. Controlling the AC current in this way helps to ensure that the AC network 42 is minimally affected by the corresponding capacitor energy regulation procedure.

As an alternative it is envisaged in other embodiments of the invention (not shown) that the secondary inductor 58 could be operated to vary its inductance so as to directly vary the voltage 59 thereacross, and thereby modify the AC current 85 flowing between the AC terminal 38 and the AC network 42.

As a result of modifying the AC current 85, using either of the techniques mentioned above, the shape of the AC voltage waveform 84*a* during the overlap period 82, as shown in FIG. 10*a*, resembles the shape of a normal AC voltage waveform 84*b*, as shown in FIG. 10*b*.

The characteristics of the AC current 85 are minimally dependent on the DC circulation current, and so the DC circulation current may be modified to follow various waveform shapes, such as square, triangular and saw tooth waveforms, without significantly affecting the connected AC network 42. Shaping the DC circulation current enables further optimisation of the power electronic converter 30 by reducing module switching frequency and minimising DC ripple in the DC voltage presented to the DC network 40.

The provision of limb portions 44,46 that are controllable to selectively define the circulation path 78 in the power electronic converter 30 enables voltage balancing of the modules 52 in the chain-link converters 50, i.e. capacitor energy balancing in the modules 52, and thereby results in a flexible power electronic converter arrangement that is compatible with a wide range of real and reactive power operating conditions.

The ability to modify the magnitude of the DC circulation current using the chain-link converters 50 is advantageous since it allows the power electronic converter 30 to operate within a wide envelope of real and reactive power operating conditions in which the real power exchange with the chain-link converters 50 varies greatly from situation to situation.

In addition, the ability to balance the voltage levels of individual modules 52, i.e. balance capacitor energy levels, is advantageous because it means that the voltage of any particular module 52 can be kept approximately equal to an average module voltage. This helps to ensure that module components are operated within their design voltage limits and the combined modules are capable of generating the appropriate range of converter terminal voltage to satisfy steady-state operation and fault responses.

The use of the chain-link converters 50 to carry out both power conversion and control the DC circulation current removes the need for separate voltage balancing equipment. This not only leads to reductions in converter hardware cost, size and weight but also simplifies the operating procedure and control scheme of the power electronic converter 30.

Additionally the switching of the chain-link converters 50 during the overlap period may be controlled to allow the commutation of the primary switching elements 48 in each limb portion 44,46 at near zero current and/or voltage. Such switching of each primary switching element 48 at low or zero current and/or voltage minimises the switching losses in the respective primary switching element 48 and thereby improves the overall efficiency of the power electronic converter 30.

FIG. 11 shows a power electronic converter 130 according to a second embodiment of the invention. The second power electronic converter 130 shares many features with the first power electronic converter 30 and these are designated using the same reference numerals.

The second power electronic converter 130 includes three converter limbs 32. Each converter limb 32 is similar in structure and operation to the converter limb 32 of the first power electronic converter 30 except that, in use, the AC terminal 38 of each converter limb 32 in the second power electronic converter 130 is connected to a respective phase of a three-phase AC network 42.

In addition, the second power electronic converter 130 includes a single DC link capacitor 60 instead of a pair of DC link capacitors 60. The single DC link capacitor 60 is connected in series between the first and second DC terminals 34,36 and is connected in parallel with each converter limb 32.

In further embodiments of the invention (not shown) a split capacitor could be included between the first and second DC terminals 34,36 with the mid-point of the split capacitor being connected to ground.

In the second power electronic converter 130, the series connection of the primary switching elements 48 and chain-link converters 50 of each converter limb 32 operates independently of that of the other converter limbs 32. As a result such operation only directly affects the phase connected to the respective AC terminal 38 and has minimal influence on the phases connected to the AC terminals 38 of the other converter limbs 32.

It is envisaged that in other embodiments, the power electronic converter may include any number of converter limbs, each converter limb including an AC terminal for connection in use to a respective phase of a multiphase AC network.

What is claimed is:

1. A power electronic converter, for use in high voltage direct current power transmission and reactive power compensation, comprising at least one converter limb including first and second DC terminals for connection in use to a DC network and an AC terminal for connection in use to an AC network, the or each converter limb defining first and second limb portions connected in series between the AC terminal and a respective one of the first and second DC terminals, each limb portion including a chain-link converter connected in series with at least one primary switching element, each chain-link converter including a plurality of modules connected in series, each module including at least one secondary switching element connected to at least one energy storage device, the or each primary switching element in each limb portion of a respective converter limb selectively defining a circulation path carrying a DC circulation current to regulate the energy level of at least one energy storage device in a respective chain-link converter,
wherein the or each primary switching element is controlled to simultaneously switch both limb portions into circuit to define the circulation paths, the or each primary switching element of each limb portion selectively defining the circulation path for a predetermined overlap period to control the duration for which the DC circulation current flows.

2. The power electronic converter according to claim 1 wherein the circulation path includes at least one DC current modifier to modify the magnitude of the DC circulation current.

3. The power electronic converter according to claim 2 wherein the or each DC current modifier modifies the magnitude of the DC circulation current to minimise any deviation in voltage of the or each energy storage device from a predetermined voltage level.

4. The power electronic converter according to claim 2 wherein the DC current modifier is or includes at least one of the chain link converters and at least one primary inductor connected in series with the or each chain-link converter, the or each chain-link converter being operable to vary its voltage to alter the voltage across the or each primary inductor and thereby modify the magnitude of the DC circulation current.

5. The power electronic converter according to claim 2 further including at least one DC link capacitor connected in series between the first and second DC terminals of the or each converter limb and connected in parallel with the or each converter limb.

6. The power electronic converter according to claim 5 further including at least one tertiary inductor connected in series with the or each DC link capacitor between the first and second DC terminals of the or each converter limb.

7. The power electronic converter according to claim 2 wherein the DC current modifier is or includes at least one variable primary inductor, the or each variable primary inductor being controlled to vary its inductance to modify the DC circulation current.

8. The power electronic converter according to claim 1 wherein the chain-link converters are operable to generate a voltage waveform at the AC terminal.

9. The power electronic converter according to claim 8 wherein each chain-link converter is operable to vary its voltage so as to generate an AC current waveform flowing between the respective AC terminal and the AC network while a circulation path is defined.

10. The power electronic converter according to claim 9 wherein the or each secondary switching element of each module of each chain-link converter is controllable to configure the respective chain-link converter to provide a stepped variable voltage source.

11. The power electronic converter according to claim 8 wherein the AC current waveform is a near approximation of a sinusoidal waveform.

12. The power electronic converter according to claim 11 wherein the plurality of series-connected secondary switching elements are connected in parallel with the respective energy storage device in a full-bridge arrangement to define a 4-quadrant bipolar module that can provide zero, positive or negative voltage and can conduct current in two directions.

13. The power electronic converter according to claim 1 further including at least one secondary inductor connected in series with the AC terminal of the or each converter limb for connection in use between the respective AC terminal and the AC network.

14. The power electronic converter according to claim 13 wherein the or each secondary inductor is controlled to vary its inductance so as to generate an AC current waveform flowing between the respective AC terminal and the AC network while the respective circulation path is defined.

15. The power electronic converter according to claim 1 wherein at least one module includes a plurality of series-connected secondary switching elements connected in parallel with a respective energy storage device.

16. The power electronic converter according to claim 15 wherein the plurality of series-connected secondary switching elements are connected in parallel with the respective energy storage device in a half-bridge arrangement to define a 2-quadrant unipolar module that can provide zero or positive voltage and can conduct current in two directions.

17. The power electronic converter according to claim 1 wherein at least one primary or secondary switching element includes at least one semiconductor device.

18. The power electronic converter according to claim 17 wherein the or at least one semiconductor device is an insulated gate bipolar transistor, a gate turn-off thyristor, a field effect transistor, an insulated gate commutated thyristor or an integrated gate commutated thyristor.

19. The power electronic converter according to claim 17 wherein at least one primary or secondary switching element further includes an anti-parallel diode connected in parallel with the or each corresponding semiconductor device.

20. The power electronic converter according to claim 1 wherein at least one energy storage device is or includes a capacitor, a fuel cell, a photovoltaic cell, a battery or an auxiliary AC generator with an associated rectifier.

21. The power electronic converter according to claim 1 wherein the chain-link converter of each limb portion is controlled to vary its voltage so as to enable switching of the or each primary switching element of the respective limb portion at near zero current and/or near zero voltage.

22. The power electronic converter according to claim 1 including multiple converter limbs, each converter limb including an AC terminal for connection in use to a respective phase of an AC network.

* * * * *